United States Patent

[11] 3,582,962

[72] Inventor Robert V. Mazza
Mahopac, N.Y.
[21] Appl. No. 772,295
[22] Filed Oct. 31, 1968
[45] Patented June 1, 1971
[73] Assignee International Business Machines Corporation
Armonk, N.Y.

[54] HAND ENTRY POSITION SENSING SYSTEM
15 Claims, 5 Drawing Figs.

[52] U.S. Cl. .......... 178/19
[51] Int. Cl. .......... G08c 21/00
[50] Field of Search .......... 178/18, 19; 340/347, 324.1; 324/63, 60

[56] References Cited

UNITED STATES PATENTS 2,803,799 8/1957 Siegel et al. .......... 324/63
3,295,057 12/1966 Dornberger et al. .......... 324/60

*Primary Examiner*—Kathleen H. Claffy
*Assistant Examiner*—Thomas L. Kundert
*Attorneys*—Hanifin and Clark and John A. Jordan ABSTRACT: A position measuring system of the writing tablet-stylus type employs a sampling control circuit which acts to sample tablet voltage in a manner to provide an output linearly representative of stylus position independent of the coupling admittance between the stylus and voltage carrying surface of the tablet. A first tablet voltage, which is a composite function of both the stylus position and the coupling admittance between the stylus and the voltage carrying surface of the tablet, is sampled and integrated over a set time interval. A second reference voltage, which is a function of only the coupling admittance, is integrated in time until it reaches the level of integration reached by the first integrated voltage. The time of integration of the second voltage is linearly related to stylus position independent of coupling admittance.

INVENTOR
ROBERT V. MAZZA

BY John A. Jordan
ATTORNEY

HAND ENTRY POSITION SENSING SYSTEM

The present invention relates to position transducers of the electronic writing tablet type and more particularly to a hand entry position measuring terminal for handprint entry of graphic input data into digital computer systems.

BACKGROUND OF THE INVENTION

A variety of techniques are employed in the prior art tablet-stylus writing apparatus for electronically determining the position of the stylus as it moved across the surface of the tablet to form graphic data.

One of the most common forms involves basically an analog technique wherein a voltage is applied across an array of resistance linearly distributed throughout the tablet. The voltage drops across the tablet resistance provides a set of measurable parameters which when sensed gives an indication of the position of the stylus. In such arrangements a switching system may be utilized to alternately apply the voltage across the tablet resistance in the X and Y directions. The position of the pen is determined by alternately measuring, in one direction and then the other, the magnitude of the voltage capacitively coupled to the stylus. The difficulty with such systems is that the voltage response of the stylus varies with variations in the capacitive coupling. Thus, variations in the thickness of the hard copy or the handling of the stylus by the user alter the stylus output voltage to thereby introduce inaccuracies.

Other prior art techniques rely on the phase relationship of applied signals to provide a varying sensitive parameter which has a measurable relation to the position of the stylus. One such system is described in U.S. Pat. application Ser. No. 720,723,to H. Dym filed Apr. 11, 1968 and assigned to the assignee of the present invention.

Another phase-dependent prior art system utilizes a pair of inphase equal frequency carrier signals modulated by equal frequency out-of-phase sign waves. The modulate signals are applied to opposite ends of the tablet distributed resistance and the sum signal detected by the capacitively coupled stylus, at a point along the distributed resistance, has phase dependence upon stylus position. One of the major difficulties with this latter type phase-dependent system is the attendant nonlinearity of the phase with respect to position and the corresponding complexity of the requirements for means to correct for these nonlinearities. Such are particularly sensitive to distortion, nonlinearity, and inaccuracy in the modulation.

Digitally dependent systems have also been employed in the prior art. One technique sued in such systems is to employ the stylus to sense signals, serially encoded in time, from the surface of a wire screen or grid arrangement representing the tablet. Some of the difficulties of such systems lie in the amount of complex circuitry required and in the fabrication of the tablet itself. The resolution of such systems is dependent upon tablet construction and more particularly upon the spacing between the grid wires. To achieve high resolution requires complex and costly manufacturing techniques.

The present invention overcomes the disadvantages of the prior art writing tablets devices by providing a simple handprint entry position measuring terminal of the analog voltage type which employs a novel voltage correction arrangement to compensate for variations in the admittance coupling between the stylus and writing tablet voltage carrying surface. For example, capacitive admittance coupling between stylus and the tablet surface, as heretofore indicated, may vary in accordance with the particular use or application of the stylus-tablet arrangement. Thus, capacitive coupling varies in dependence upon the thickness of the interposed hard copy upon which data is to be handprinted. In addition, capacitive coupling may also vary in dependence upon the particular handling by the user. For example, variation in the angle at which the stylus is held during writing or in the writing pressure may vary the capacitive coupling. It is to be understood that although for the sake of discussion reference is made to capacitive coupling, it is clear that other forms of admittance coupling may be present which coupling would likewise be corrected for, in accordance with the novel aspects of the present invention.

In accordance with the novel aspects of the present invention a rapid sampling circuit is provided whereby the stylus-sensed voltage is first sampled to produce a voltage, the magnitude of which is a composite function of both the stylus position and the size of the coupling capacitance between the tablet voltage carrying surface and stylus. This voltage is integrated over the sample interval and held. At termination of the first sample interval a second reference voltage is sampled to provide a voltage which is a function of only the coupling capacitance. The second voltage is integrated until the level of integration compares with the level of integration of the first sampled voltage. The time required for the second voltage to integrate to the level of integration of the first voltage is a true function of the stylus position, with the error voltage introduced by the effect of the coupling capacitance eliminated. Successive alternate sampling of the first and second voltages, as the stylus is moved over the tablet surface, provides a continuously corrected output indication which is a highly linear function of the true stylus position.

It is therefore an object of this invention to provide an improved position measuring device.

It is therefore another object of the present invention to provide an improved electronic writing tablet exhibiting increased accuracy and linearity in transducing handprinted data into electrical signals.

It is a further object of this invention to provide a position transducer of the table-stylus type capable of providing an output indication which is independent of the electrical signal admittance coupling between the stylus pickup and voltage carrying surface of the tablet.

It is an additional object of this invention to provide an improved electronic writing tablet which provides an accurate electrical output indication of the position of the stylus while at the same time permitting unfettered use of the stylus.

It is still a further object of this invention to provide an electronic writing tablet which allows hard copy production of the entered data while at the same time allowing production of electrical signals which are a substantially linear function of the entered data, independent of the hard copy thickness.

It is yet another object of this invention to provide a position transducer of the handprint data entry terminal type which provides correction for voltage variations due to variations in the coupling capacitance between stylus and tablet to thereby provide increased resolution, accuracy and linearity of response.

It is yet another object of this invention to provide an improved computer data entry terminal to accurately transform hand produced graphic data into digital signals by employing a novel sampling and conversion system which acts first to sample and correct analog voltages capacitively coupled to the stylus pickup from the tablet voltage producing surface and then acts to simply and effectively convert the corrected analog voltage into digital coordinates.

The foregoing and other objects, features and advantages of the invention will be apparent from the following more particular description of preferred embodiments of the invention, as illustrated in the accompanying drawings.

DETAILED DESCRIPTION OF THE DRAWINGS

Figure 1:
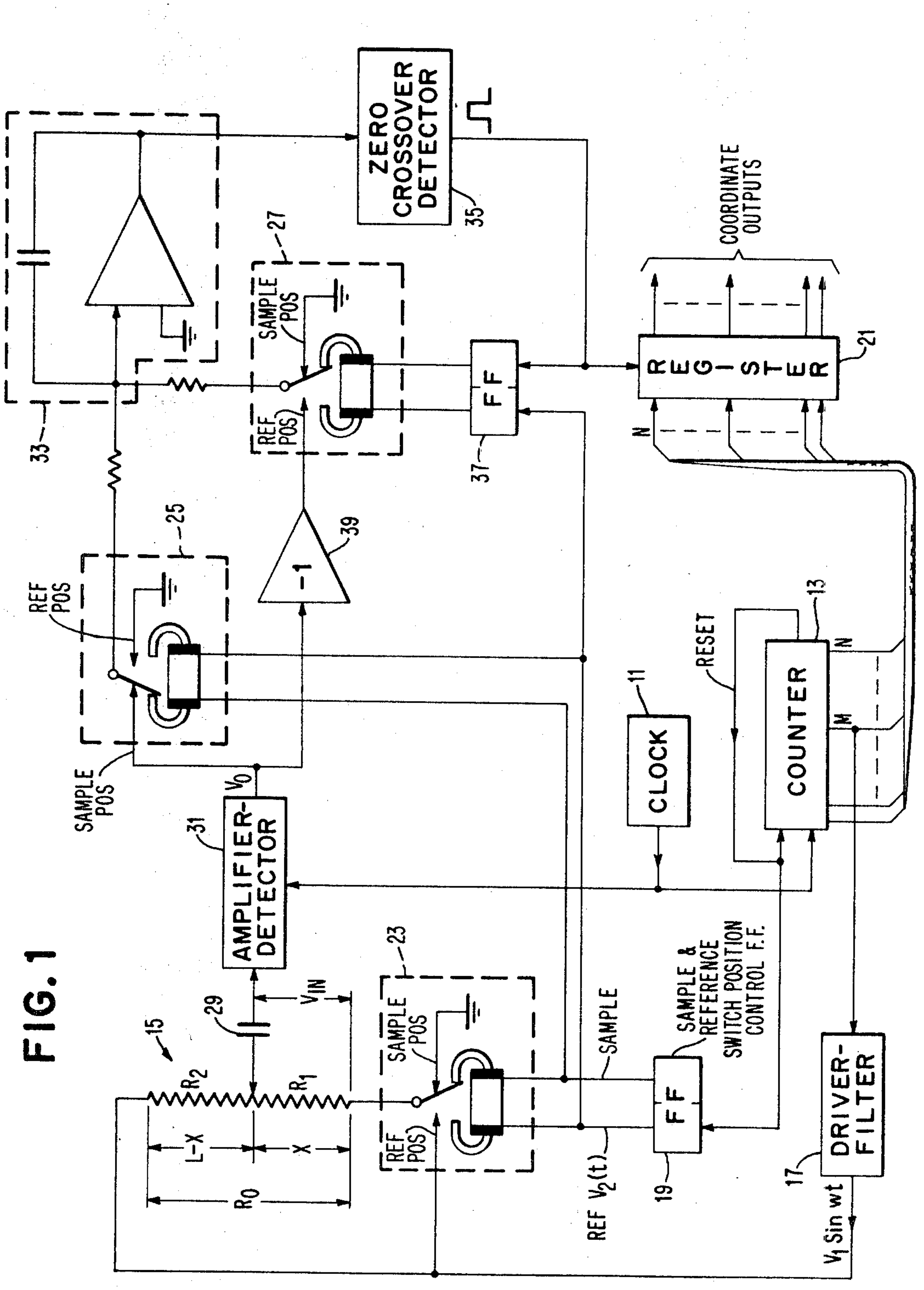
FIG. 1 shows a single axis version of the position measuring system in accordance with the novel aspects of the present invention.

The system shown if FIG. 1 illustrates for simplicity of explanation, a one dimensional position measuring system in accordance with the novel concepts of the present invention. As shown therein a single clock pulse source 11 is employed to drive and synchronize all operations in the system. Accordingly, drift problems are obviated. Clock 11 is coupled to N stage counter 13, which may be an N stage binary counter. Counter 13 acts as both a timing device to determine the time of integration and as a source of properly timed control pulses. As can be seen in FIG. 1 stage M of counter 13 acts to provide drive pulses, for driver-filter 17, at a rate which is a submultiple of the clock 11 pulse rate but greater than the *N*th stage output pulse rate. Driver-filter 17 filters a component from the pulses received from counter 13 and amplifies the same to provide the periodic sine wave signal shown in waveform (a) of FIG. 3. The sine wave is applied across resistance divider 15 which resistance represents the table resistance, and the divider pointer represents the stylus. It is clear that although a sine wave has been shown, any form of periodic signal would be adequate.

Counter 13 also acts to control sample and reference switch position control flip-flop 19 as well as to repetitively generate a binary count to be loaded into register 21 at the proper time. Flip-flop 19 functions to control the alternate sampling intervals of electronic switches 23, 25 and 27.

Figure 3:
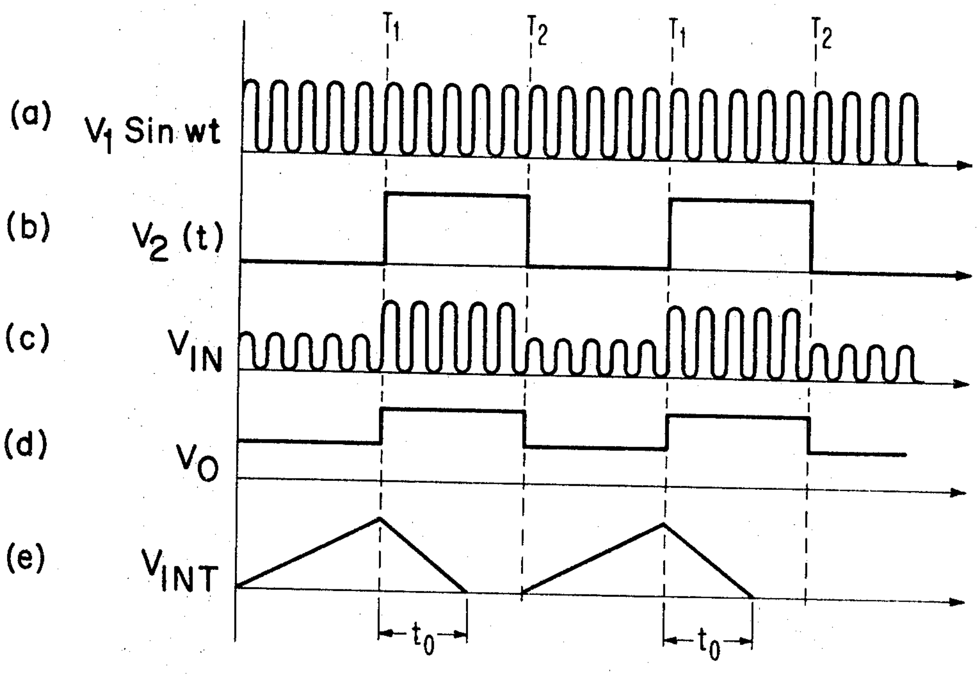
FIG. 3 shows a series of concurrent voltage waveforms as seen at key points in the system of the present invention.

Capacitor 29 represents the coupling capacitance between the stylus and sensing surface of resistance 15. AC signals are coupled via capacitor 29, to clock synchronized amplifier-detector 31 from resistor 15. The detected output voltage form amplifier-detector 31, shown by waveform (d) in FIG. 3, is coupled via switch 25, directly to integrator 33 during a first sampling interval. During a second sampling interval the amplifier-detector output voltage is inverted by inverter 39 and coupled, via switch 27, to integrator 33.

Figure 5:
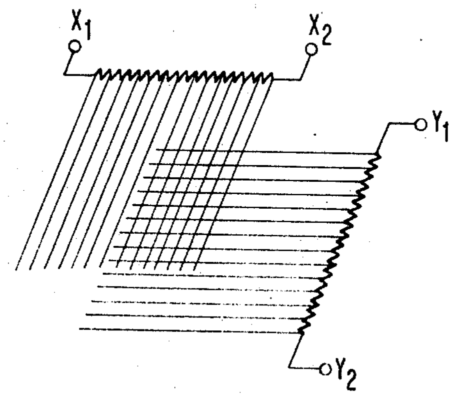
FIG. 5 shows one possible from of a resistance grided array which might be employed in the writing tablet of FIG. 4.
Figure 4:
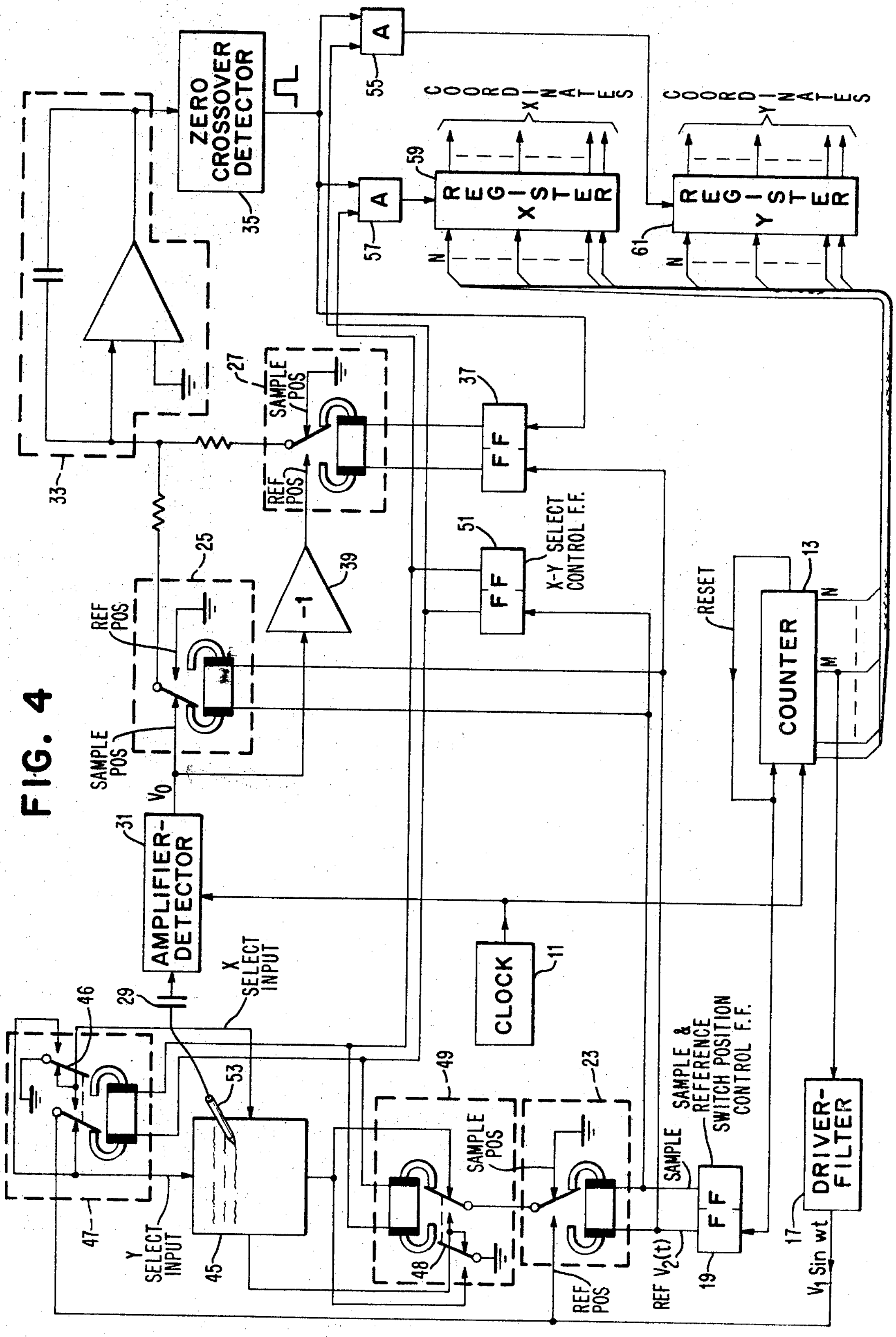
FIG. 4 shows a two dimensional position measuring system in accordance with the novel aspects of the present invention.

FIG. 4 shows a two-dimensional position measuring system in accordance with the novel aspects of the present invention. Writing tablet 45 may employ any of a variety of well known techniques for producing two-dimensional voltage division. FIG. 5 shows one possible arrangement Alternatively a single solid resistive sheet might be used. It is apparent that any arrangement which provides a voltage drop in both the X and Y directions will suffice, although some arrangements will be preferred over others.

Likewise, sensing stylus 53 may utilize any of a variety of well-known arrangements or voltage pickup. A conventional ballpoint pen employing a conductive cartridge and adapted to allow an electrical connection to the cartridge has been found satisfactory. Such an arrangement functions to provide voltage pickup for electronically sensing the forms created by the movement of the stylus and also functions to allow the making of a permanent hard copy of these forms on a writing medium interposed between the stylus and tablet.

The system arrangement shown in FIG. 4 employs all of the components of FIG. 1 . In addition the system employs the necessary components required to implement a two-dimensional arrangement; namely, AND gates 55 and 57, registers 59 and 61, switches 47 and 49 and a control flip-flop 51 for the switches. Switches 47 and 49 alternately switch voltage sampling between X and Y axis in response to control pulses from flip-flop 51. Thus, voltage measurements can be obtained in both the X and Y direction.

DESCRIPTION OF OPERATION

A description of the operation of the measuring system of FIG. 1 will make clear the principles employed to correct for variations in stylus-tablet coupling capacitance so that the digital output voltage therefrom will be linearly related to stylus position.

Referring to FIG. 1 it can be seen that electronic switch 23 acts to modulate the driver-filter 17 $V_1$ Sin $\omega t$ output signal, applied to bleeder resistor 15. This $V_1$ Sin $\omega t$ signal is of a frequency $\omega$ sufficient to provide good AC coupling between the tablet and stylus. The rate at which switch 23 modulates $V_1$ Sin $\omega t$ is determined by counter 13, and counter 13 is selected to provide an output pulse to switch position control flip-flop 19 at a rate greater than the rate at which the coupling capacitance will change. Thus, switch 23 alternates between the ground sample position and the reference position to modulate $V_1$ Sin $\omega t$ at this rate.

The driver-filter 17 output voltage is depicted by waveform (a) in FIG. 3 and the reference output voltage $V_2(t)$ of switch position control flip-flop 19 is depicted by pulse waveform (b) in FIG. 3. The modulated form of waveform (a), as seen by the pointer of resistance divider 15, is depicted by waveform (c). This voltage, designated *Vin*, is amplified and detected by amplifier-detector 31 to give an output signal depicted by waveform (d) of FIG. 3.

As seen with reference to FIG. 3, then, in the time interval from $T_2$ to $T_1$ the flip-flop 19 reference output voltage level is down and the sample output voltage level is up. Switch 23 is therefore in the grounded sample position and the voltage V*in* is referenced thereto During this sample interval the voltage V*in* sensed by the stylus, is a composite function of both stylus position X, as determined by the ratio $R_1$ to $R_2$, and coupling capacitance.

The voltage V*in* can be represented during the interval $T_2$ to $T_1$ by the expression $$\text{Vin } (t) = K_c \frac{R_1}{R_0} V_1 \sin \omega t$$

where $R_0=R_1R_2$, $K_c$depends upon the value of the coupling capacitance and amplifier-detector 15 is chosen to exhibit a negligible loading factor on resistor-divider 15. Amplifier-detector 31 output voltage $V_0$can be represented, during the $T_2$to $T_1$interval, by the expression $$V_0(x) = K\frac{X}{L}V_1$$

where X is the distance of the pointer from the grounded end of resistance divider 15, L is the total length of the resistance divider and K depends upon the value of both the coupling capacitance and the gain of amplifier-detector 31.

Upon commencement of the interval $T_1$ to $T_2$ switch 23 is switched to its reference position in response to the change in state of flip-flop 19. Now, the magnitude of the voltage V*in* is a function of the amplitude of both $V_1$ and $V_3$, $V_3$ being that portion of the magnitude of the $V_1$ voltage signal passed by switch 23 in the reference position, in response to the $V_2(t)$ control signal from flip-flop 19. In this interval $V_o$ may be expressed by $$V_o(x) = K\left[\frac{X}{L}V_1 + \frac{(L-X)}{L}V_3\right]$$

Since the mechanical off-on switch 23 presents negligible impedance, thus acting to provide 100 modulation, $V_1=V_3$ and $V_{o(}x) = KV_1$, independent of position of the pointer of resistance divider 15.

Thus, during the interval $T_2$to $T_1$the magnitude of the amplifier-detector 31 output voltage $V_o$is a function of both stylus position and coupling capacitance while curing the interval $T_1$to $T_2$the magnitude of the detector output voltage $V_p$is only a function of coupling capacitance.

Integrating the amplifier-detector 31 output voltage $V_o$during the fixed time interval $T_2$to $T_1$gives $$\int_{T_2}^{T_1} V_o dt = K\int_{T_2}^{T_1} X/LV_1 dt = KX/LV_1(T_1 - T_2)$$

Now, if starting at time $T_1$the amplifier-detector output voltage $V_o$is integrated until it reaches the above integrated value, i.e., UNTIL $$\int_{T_2}^{T_1} V_o dt - \int_{T_1}^{T_1+t_o} V_o dt = KX/LV_1(T_1-T_2) - Kt_oV_1 = 0$$

then, $$\frac{X}{L} = \frac{t_o}{T_1-T_2}$$

thus indicating the position of the resistance divider 15 pointer (stylus) is directly proportional to the time of integration, $t_o$, of the reference signal, independent of coupling capacitance.

Figure 2:
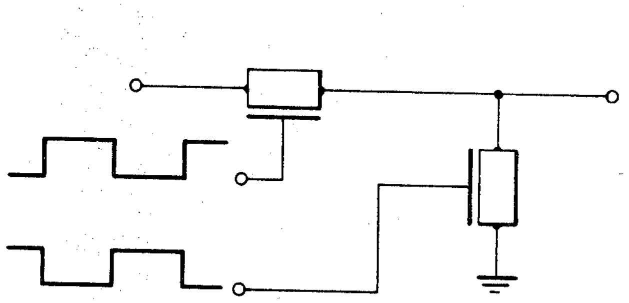
FIG. 2 shows transistor switching arrangement illustrative of a type of electronic switch that might be employed in place of the relay switches depicted in FIGS. 1 and 4.

It is to be noted that the transistor switching arrangement of FIG. 2 may be employed in place of the mechanical switches of FIGS. 1 and 4. When specifically employed for mechanical switch 23 in FIGS. 1 and 4 a condition whereby transistor 22 is fully conductive and transistor 24 fully cutoff corresponds to the reference position of the mechanical switch. It is evident that were transistor 22 to present a less than negligible impedance at this time, the above expression indicating that the position of the divider pointer 15 is only a function of the time of integration, $t_o$would still hold true.

The sampling and integration arrangement of FIGS. 1 and 4 act to perform the measurement of the time $t_o$. Since the time duration of the measurement taken between the interval $T_2$to $T_1$is short as compared to the rate at which the coupling capacitance may change, the time $t_o$is independent of the specific value of the capacitance.

With reference to FIG. 1, when the sample output level of flip-flop 19 goes up, in response to a full count on counter 13, the time interval $T_2$to $T_1$shown in FIG. 3, commences and switches 23, 25 and 27 are switched into their sample positions, as shown. With switch 23 in the grounded sample position the magnitude of the $V_o$signal from amplifier-detector 31 is a function of both the stylus position and coupling capacitance. The $V_o$signal, as shown by waveform (d) in FIG. 3, is integrated by integrator 33 in FIG. 1, as shown by waveform (e) in FIG. 3. At the end of the $T_2$–$T_1$interval, as determined by the full count of counter 13, flip-flop 19 changes state and the reference control output line goes up.

Switches 23, 25 and 27 are now all switched to their reference positions and the voltage integrated by integrator 33 is held. The magnitude of the output voltage $V_o$from amplifier-detector 31 is now in the form of a reference voltage which is a function of only the coupling capacitance.

With switches 25 and 27 in their reference position the $V_o$output voltage is inverted by inverter 39 and integrator 33 commences to integrate in the downward direction from the level of the previously held integrated voltage. This is shown by waveform (e) in FIG. 3. When the downward integration reaches zero then the reference voltage has been integrated to a level equal to the level of integration reached during the grounded sampling interval. The time, $t_o$, required to reach this level is, as hereinbefore shown, directly proportional to the stylus position.

Zero crossover detector 35 detects when the downward integration reaches zero. It is to be noted that the output signal form detector 35 could be used to terminate the reference interval by changing the state of flip-flop 19. The reference interval, as shown by waveform (b) in FIG. 3, would than be width modulated and an analog output indication of stylus position could be obtained.

However, in accordance with the preferred embodiment the output pulse of detector 35 is used to load register 21 with the current binary count of counter 13, as well as reset switch 27, via flip-flop 37.

Since counter 13 started counting at the beginning of the measurement of $t_o$ the binary number loaded into register 21 at the end of $t_o$ is indicative of the digital stylus coordinate, at that time.

The two-dimensional system of FIG. 4 operates to control the periodic drive signal current alternately though tablet 45 in the X and Y directions to perform the same function, according to the same principles, as the system of FIG. 1. Electronic switches 47 and 49 function to direct current flow in the X-direction when each switch is in the X-select position and in the Y-direction when each switch is in the Y-select position. Gang operated grounding pole pieces 46 and 48 are respectively employed in switches 47 and 49 to ground the X-direction current path through the tablet when current is flowing in the Y-direction and to ground the Y-direcgion current path through the tablet when current is flowing in the X-direction.

Switches 47 and 49 are under control of X–Y select control flip-flop 51. Flip-flop 51 changes state in response to the leading edge of each sample pulse from flip-flop 19. Thus, switches 47 and 49 are coincidentally switched alternately between the X-select and Y-select positions. While the switches are in each position a complete measuring cycle is performed.

The digital coordinates of the stylus location as determined by the count in counter 13 at zero crossover time are loaded and buffered in registers 57 and 61 in dependence upon whether the stylus position is being measured in the X-direction or the Y-direction. When the stylus position in the X-direction is being measured the X-select output of flip-flop 51 acts to enable AND gate 57 to allow the zero crossover pulse to load the X-register. Alternatively, if the Y-position of the stylus is being measured the Y-select of flip-flop 51 enables AND gate 55 to allow the zero crossover pulse to load the Y-register.

From the above description it can be seen that as the stylus is moved across the tablet point-by-point, digital coordinates of the path being traced are provided. It is clear that the rate at which the stylus is manually moved on the tablet surface is much slower than the rate of position measurement. It is also clear that by employing a voltage divider arrangement wherein the distribution of the voltage is uniform and continuous, no dead spots are encountered. Accordingly, high system resolution as well as linearity of response are afforded. It is to be noted in this regard that although for purposes of explanation a resistance voltage divider has been shown any form of impedance voltage divider may be employed.

Although the preferred embodiments of the present invention show successive single sampling, it is to be understood that other forms of sampling may be used and such forms are also contemplated. For example, a multiplicity of sample and reference signals may be combined, compared or correlated to provide correction data for the effects of variation in the velocity of movement of the stylus, or to accommodate for variations in the dynamic coupling, or to specify and fix frequency response characteristics. While the invention has been particularly shown and described with reference to preferred embodiments thereof, it will be understood by those skilled in the art that various changes in form and details may be made therein without departing from the spirit and scope of the invention.

What I claim is:

1. A position transducer system comprising:

voltage gradient producing means producing a distributed voltage variation as a function of position in the direction of variation;

voltage sensing means coupled by admittance to sense voltage at positions along said voltage gradient producing means;

means causing said voltage sensing means to sense a first voltage from said voltage gradient producing means which is a composite function of both the position of said sensing means along said voltage gradient producing means and said admittance and a second voltage which is a function of said admittance; and means for determining the ratio to said first and second voltages to provide an output indication which is linearly related to the position of said voltage sensing means and is substantially independent of variation in coupling admittance.

2. The system as set forth in claim 1 wherein said admittance is capacitive.

3. In a position conversion system for reproducibly converting position into electrical signal indications including:

voltage gradient producing means for producing a spatial voltage variation in at least one direction as a function of position in that direction;

voltage sensing means coupled by admittance to said voltage gradient producing means;

means for sampling and storing a first output voltage from said voltage sensing means which output voltage is a composite function of both the position of said voltage sensing means an said voltage gradient producing means and said admittance;

means for sampling and storing a second output voltage from said voltage sensing means which output voltage is a function of admittance exclusive of position; and means for comparing said first and second stored voltages to provide a ratio thereof which is reproducibly related to positions on said voltage gradient means, independent of admittance.

4. In a handprint data entry transducer terminal system employing an electronic writing tablet and stylus wherein the stylus output voltage is an analog function of the position of the stylus on the tablet writing surface, including conversion means, said conversion means comprising:

integration means coupled to said stylus including means for integrating said stylus output voltage over a set interval of time;

means including timing means coupled to initiate integration of a reference voltage by said integration means at the beginning of a timing sequence in said timing means;

output means coupled to said integration means including means to indicate the time, $t_o$, in said timing sequence at which the level of integration of said reference voltage reaches the level of integration reached by said stylus output voltage over said set interval of time.

5. The system as set forth in Claim 4 wherein said stylus output voltage over said set interval of time is a function of both the stylus position on said tablet writing surface and the coupling admittance between said stylus and the tablet voltage carrying surface, and said reference voltage is a function of said coupling admittance.

6. The system as set forth in Claim 5 wherein said system is under control of said timing means and said timing means includes a clock pulse source and a resettable counter with the time required for the clock pulses from said clock pulse source to sequence all stages of said counter being greater than the time, $t_0$.

7. The system as set forth in Claim 6 wherein said output means includes storage registers coupled to said counter and responsive to said means to indicated to load the count in said counter into said registers.

8. In the electronic position transducer system including:

voltage producing means producing a distributed voltage variation in at least one direction which is a continuous function of distance in that direction;

control means coupled to said voltage producing means including means to alternately switch said voltage producing means between a sample interval wherein said voltage variation is produced and a reference interval wherein a reference voltage is produced;

voltage pickup means electrically coupled by admittance to a position along said voltage producing means to provide an output voltage, and output voltage, said output voltage being a composite function of both said position and said admittance during said sample interval and a function of said admittance during said reference interval;

means for integrating said pickup means output voltage over sample intervals and holding the integrated voltage value at the end of said sample intervals;

means for integrating said pickup means output voltage within reference intervals; and comparing means to determine when the value of voltage integrated during said reference intervals reaches said integrated voltage value at the end of said sample intervals.

9. The system as set forth in Claim 8 wherein said means for integrating over said sample intervals and said means for integrating within said reference intervals respectively integrate on individual alternate sample and reference intervals.

10. In a conversion system for converting handprinted graphic data into electrical signals comprising:

writing tablet means having voltage divider means including X-direction and a Y-direction impedance voltage divider means for providing distributed tablet voltage in the X and Y directions and including means for applying a periodic voltage signal alternately across said X-direction and said Y-direction impedance voltage divider means;

stylus voltage pickup means coupled by admittance to said voltage divider means for sensing said tablet voltage as a function of stylus position on said tablet;

control circuit means for alternately switching said voltage divider means between a first sample position wherein a first tablet voltage is produced the magnitude of which is a composite function of both said stylus position and said admittance and a second reference position wherein a second tablet voltage is produced the magnitude of which is a function of said admittance;

detecting means coupled to said stylus for detecting the envelope of the periodic voltage produced by said tablet;

circuit means coupled to said detecting means and including means for causing integration of the envelope of said first tablet voltage to provide a first integrated voltage level;

said circuit means including further means for causing integration of the envelope of said second tablet voltage until it reaches said first integrated voltage level; and means coupled to said further means to indicate the period of time required for integration of said envelope of said second tablet voltage to the level of said first integrated voltage whereby said time is linearly related to the position of said stylus, independent of admittance.

11. The system as set forth in claim 10 with output means including digital means to digitally determine said period of time whereby the digitally determined time is indicative of the stylus position coordinates.

12. In a graphic information to digital data conversion system including a transducer system with electronic writing tablet means and stylus sensing means wherein the stylus output voltage is an analog function of the position of the stylus on the writing tablet surface;

sampling and integrating means coupled to said stylus for integrating said stylus output voltage over a set interval of time;

circuit means including counting means and control circuit means to initiate integration of a reference voltage upon initiation of a count sequence in said counting means;

comparing means responsive to said sampling and integrating means and to said circuit means for providing an output signal when the level of integration of said reference voltage reaches the level of integration of said voltage integrated within said set interval of time;

register means responsive to the output signal of said comparing means for transferring the count on said counting means into said register means to thereby provide digital output coordinates indicative of stylus position.

13. A graphic data entry terminal comprising:

voltage gradient producing means for producing a spatial voltage variation in at least one direction as a function of position in that direction;

stylus means coupled by admittance to said voltage gradient producing means to sense voltage from said voltage gradient producing means via said admittance coupling;

circuit means coupled to said voltage gradient producing means and stylus means for causing integration over a first fixed time interval of a first voltage from said voltage gradient producing means which is a function of both the position of said stylus and said admittance and for causing integration over a second time interval of a second voltage from said voltage gradient producing means which is a function of said admittance exclusive of position; and means to terminate the integration over said second time interval when the level of integration of said second voltage reaches the level of integration of said first voltages, the time required to integrate said second voltage to the level of integration of said first voltage being reproducibly related to the position of said stylus, substantially independent of admittance.

14. A position transducer arrangement comprising:

distributive impedance means for producing a voltage gradient which gradient varies as a function of position along said impedance means;

means coupled to said impedance means for energizing said impedance means to provide said voltage gradient across said impedance means over a fixed time interval and for energizing said impedance means to provide a uniform reference voltage across said impedance means over a variable time interval;

voltage sensing means variably coupled by admittance to said distributive impedance means to sense voltage over said fixed time interval which is a function of both the position of said sensing means on said distributive impedance means and said admittance and to sense voltage over said variable time interval which is a function of said admittance;

integrating means coupled to said sensing means to first integrate the voltage sensed over said fixed time interval and then integrate said reference voltage until the level of integration of said reference voltage equals the level of integration of said voltage integrated over said fixed time interval, the time interval required for the said level of integration of said reference voltage to build to the level of integration of said voltage integrated over said fixed time interval being said variable time and a function of the relative position of said sensing means on said distributive impedance means.

15. A position transducer arrangement comprising:

an electronic writing tablet means including impedance means for alternately producing spatial voltage variations in the X-direction and the Y-direction as a function of position in those directions;

means for energizing said writing tablet in said X-direction for a first fixed interval of time including means to energize said impedance means to provide said voltage variation in the x-direction across said impedance means as a function of position for an initial fixed subinterval of said first interval of time and to provide a uniform reference voltage across said impedance means over a variable interval time, said variable interval of time being less than the difference in time between said first fixed interval of time and said subinterval of time, and means for energizing said writing tablet in said Y-direction for a second fixed interval of time including means to energize said impedance means to provide said voltage variation in the Y-direction across said impedance means as a function of position for an initial fixed subinterval of said second fixed interval of time and to provide a uniform reference voltage across said impedance means over a variable interval of time, said variable interval of time being less than the difference in time between said second fixed interval of time and said subinterval of time;

voltage sensing means variably coupled by admittance to said writing tablet means to sense voltage from said writing tablet means, the voltage sensed during the subinterval of each of said first and second fixed interval of time being a composite function of both the position of sensing means on said writing tablet means in the respective said x- and y-directions and said admittance and the voltage sensed during the said variable interval of time of each of said first and second fixed interval of time being a function of admittance, exclusive of position;

integrating means coupled to said sensing means to alternately integrate the voltage sensed during said first and second fixed intervals of time, said integrating means acting to first integrate the voltage sensed over said fixed subinterval of time and then to integrate said reference voltage until the level of integration of said reference voltage equals the level of integration of said voltage integrated over said fixed subinterval of time, the time interval required for the said level of integration of said reference voltage to build to the level of integration of said voltage integrated over said fixed subinterval of time being said variable interval of time and a function of the relative position of said sensing means on said writing tablet in the respective x and y-directions.